Sept. 23, 1958   J. H. JOHNSTONE, JR   2,853,670
MOTOR CONTROL CIRCUIT
Filed March 22, 1954
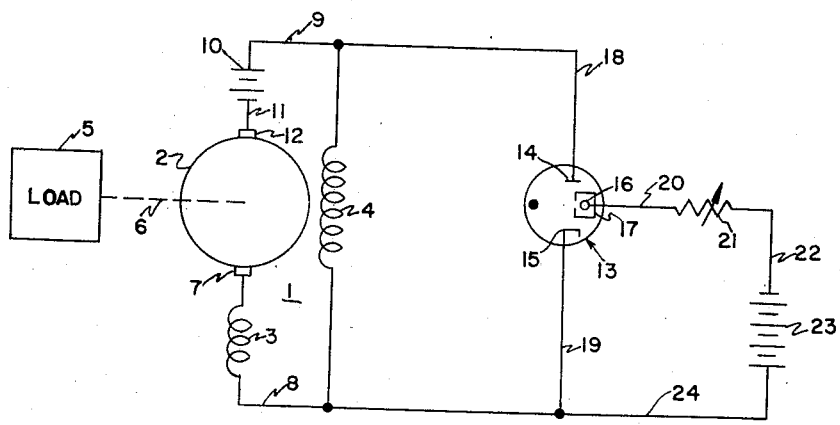
INVENTOR.
JOHN H. JOHNSTONE, JR.
BY

United States Patent Office 2,853,670
Patented Sept. 23, 1958

2,853,670
MOTOR CONTROL CIRCUIT

John H. Johnstone, Jr., Shrewsbury, N. J., assignor to Bendix Aviation Corporation, Eatontown, N. J., a corporation of Delaware Application March 22, 1954, Serial No. 417,560

2 Claims. (Cl. 318—357)

The present invention relates to dynamoelectric machines and more particularly to the use of a plasmatron to control a function of a dynamoelectric machine.

It is often desirous to operate small motors at a substantially constant speed. However, it has been found that changes in load may tend to cause changes in speed. Loading of the motor causes a decrease in speed.

In the present invention the aforementioned difficulty is overcome by connecting the winding, normally connected in shunt across the armature, in series with the winding normally connected in series with the armature winding, and shunting the first mentioned winding with a controllable gas diode such as a plasmatron.

It is an object of the invention to provide a novel control for a dynamoelectric machine.

Another object of the invention is to provide a novel and relatively simple speed control for a small motor.

Another object of the invention is to utilize a plasmatron for controlling the speed of a small motor.

Another object of the invention is to provide a novel circuit for a motor whereby the speed of the motor will be substantially constant.

The above and other objects and features of the invention will appear more fully hereinafter from a consideration of the following description taken in connection with the accompanying drawing wherein one embodiment of the invention is illustrated by way of example.

In the drawings:

The single figure is a schematic diagram of a system embodying the invention.

Referring now to the drawing, a motor is indicated generally by the numeral 1 and has an armature 2, a first series winding 3 and a shunt winding 4. A load 5 may be connected to the armature 2 by a shaft indicated by the dashed line 6.

One side of the winding 3 is connected by brush 7 to the armature 2. The other side of the winding 3 is connected by conductor 8 to one side of the winding 4 while the other side of the winding 4 is connected by conductor 9 to one side of a source of energy, such for example as a battery 10. The other side of the battery 10 is connected by conductor 11 and brush 12 to the armature 2.

A continuously controllable gas filled electron discharge device 13, illustrated as a plasmatron, is connected across the winding 4. The device 13 has an anode 14, a cathode 15 and an auxiliary cathode 16. The auxiliary cathode 16 is surrounded by a constricting electrode or garrote 17. The anode 14 is connected by a conductor 18 to the conductor 9 and the cathode 15 is connected by a conductor 19 to the conductor 8. The auxiliary cathode 16 and garrote 17 are connected by conductor 20 to one side of a variable resistance 21. The other side of the resistance 21 is connected by conductor 22 to one side of a control voltage supply, illustrated as a battery 23. The other side of the battery 23 is connected by conductor 24 to the cathode 15.

In an electron discharge device of the type described, a relatively large current may be controlled by a small current. This control is accomplished by directing a stream of electrons into the inter-electrode space of a cathode type diode. These electrons effectively neutralize the space charge thereby allowing more electrodes to reach the anode. The ionizing electrode stream is achieved by surrounding an auxiliary cathode by an electrode which constricts a gaseous discharge between the auxiliary cathode and the diode. Control of the ionizing electron stream can be effected by variations of the external circuit impedance, variations of a bias voltage between the garrote and control cathode, and variations in the control current supply.

In operation, the usual shunt winding 4 of the motor 1 is connected in series with the winding 3 and is shunted by the device 13. A predetermined speed of operation of the motor 1 is selected by adjustment of the resistor 21. The control current on the auxiliary cathode 16 determines the output current of the device 13.

At zero current through the tube maximum voltage appears across the winding 4 and the drop across the armature 2 and field 3 is a minimum. As the current through the device 13 increases, sufficient armature field is induced to cause rotation of the armature and increase in armature drop. The magnetic field in the winding 4 decreases causing an increase in rotational speed.

As the armature shaft is loaded, the voltage drop and back E. M. F. across the armature decreases. This causes an increase in current in the field 3 thus developing an increased torque to handle the load. Inasmuch as the resistance of the field 4 remains constant and the conductivity of the device 13 increases, the increase in current will be shunted around the field 4 through the device 13. In other words, the device 13 acts as a variable resistance device, decreasing resistance with an increase in current.

Although only one embodiment of the invention has been illustrated and described, various changes in the form and relative arrangement of the parts, which will now appear to those skilled in the art, may be made without departing from the scope of the invention.

What is claimed is:

1. A control system for a motor having an armature, a series field winding and a shunt field winding connected in series with said series field winding, comprising a plasmatron gas discharge device, circuit means connecting said device in shunt with said shunt field, and means for biasing said device to a predetermined ionization to increase the conductivity of said device with increased current flow whereby the increase in current flow is shunted around said shunt winding.

2. A dynamo-electric machine comprising an armature, a series winding, a shunt winding, means for connecting said windings in series with said armature, a plasmatron, circuit means connecting said plasmatron across said shunt winding, and means for biasing said plasmatron to a predetermined ionization whereby said device increases in conductivity with increase in current to shunt said increase in current by said shunt winding.

References Cited in the file of this patent

UNITED STATES PATENTS 1,063,608     Shaw et al. _____ June 3, 1913

FOREIGN PATENTS 566,811     France _____ Nov. 27, 1923
265,613     Great Britain _____ Aug. 25, 1927